(12) United States Patent
Burton et al.

(10) Patent No.: US 6,874,074 B1
(45) Date of Patent: Mar. 29, 2005

(54) SYSTEM AND METHOD FOR MEMORY RECLAMATION

(75) Inventors: Felix Burton, San Mateo, CA (US); Sandeep Dutta, Foster City, CA (US)

(73) Assignee: Wind River Systems, Inc., Alameda, CA (US)

( * ) Notice: Subject to any disclaimer, the term of this patent is extended or adjusted under 35 U.S.C. 154(b) by 348 days.

(21) Appl. No.: 09/711,589

(22) Filed: Nov. 13, 2000

(51) Int. Cl.$^7$ .......................... G06F 12/16; G06F 12/02
(52) U.S. Cl. ...................... 711/170; 711/158; 707/206; 717/140
(58) Field of Search .................................. 707/206, 205, 707/101; 711/154, 158, 170; 717/140

(56) References Cited

U.S. PATENT DOCUMENTS

| | | | | |
|---|---|---|---|---|
| 5,845,298 A | * | 12/1998 | O'Connor et al. | 707/206 |
| 5,930,807 A | * | 7/1999 | Ebrahim et al. | 707/206 |
| 6,081,665 A | * | 6/2000 | Nilsen et al. | 717/116 |
| 6,289,360 B1 | * | 9/2001 | Kolodner et al. | 707/206 |
| 6,317,756 B1 | * | 11/2001 | Kolodner et al. | 707/206 |
| 6,317,872 B1 | * | 11/2001 | Gee et al. | 717/152 |
| 6,349,312 B1 | * | 2/2002 | Fresko et al. | 707/205 |
| 6,502,110 B1 | * | 12/2002 | Houldsworth | 707/206 |
| 6,526,422 B1 | * | 2/2003 | Flood et al. | 707/206 |
| 6,529,919 B1 | * | 3/2003 | Agesen et al. | 707/206 |

OTHER PUBLICATIONS

Executable and Linkable Format (ELF).
Garbage Collection, Algorithms for Automatic Dynamic Memory Management; Richard Jones, Rafael Lins; chapter 8 and 9.
Personal Jworks Programmer's Guide 3.0; edition 1; May 20, 1999; pp. 7–8.
FastJ Compiler Suite Users Guide 4.3; edition 1; Jun. 30, 1999; pp. 78–79.

* cited by examiner

*Primary Examiner*—Mano Padmanabhan
*Assistant Examiner*—Jasmine Song
(74) *Attorney, Agent, or Firm*—Fay Kaplun & Marcin, LLP

(57) ABSTRACT

A method for memory reclamation is disclosed that includes marking a memory object when an attempt to alter a reference to the memory object is detected by a software write barrier. Marking be by using representations ("black," "white", "gray") stored as part of a garbage collection information data structure associated with each memory object. Initially, all allocated memory objects are marked white. Objects are then processed such that objects referenced by pointers are marked gray. Each object marked gray is then processed to determine objects referenced by pointers in it, and such objects are marked gray. When all objects referenced by pointers in the selected gray objected have been processed, the selected gray object is marked black. When all processing has been completed, objects still marked white may be reclaimed. Also described is a garbage collector which runs as a task concurrently with other tasks. A priority of the garbage collector may be increased to prevent interruption during certain parts of the garbage collection procedure.

25 Claims, 9 Drawing Sheets

SYSTEM AND METHOD FOR MEMORY RECLAMATION

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

Traditional multitasking operating systems (e.g., UNIX, Windows) have been implemented in computing environments to provide a way to allocate the resources of the computing environment (e.g., CPU, memory, Input/Output (I/O) devices) among various user applications that may be running simultaneously in the computing environment. The operating system itself includes a number of functions (executable code) and data structures that may be used to implement the resource allocation services of the operating system. A program that performs actions may be referred to as a task (also known as a "thread"), and a collection of tasks may be referred to as a "process". Upon loading and execution of the operating system into the computing environment, "system tasks" and "system processes" are created in order to support the resource allocation needs of the system. User applications likewise, upon execution, may cause the creation of tasks ("user tasks") and processes ("user processes") in order to perform the actions desired from the application.

Resources may be allocated to a task "statically" at a task's creation, for the entire duration of the task's existence. Alternatively, resources may be allocated to a task "dynamically", when requested by the task. Memory may be allocated to tasks as "memory objects", which may be contiguous blocks of memory, identified by a pointer or reference. Memory objects may, but need not, correspond to so-called "objects" in an object-oriented programming language like C++ and Java. Allocated memory objects may include special fields or locations that store information about the memory object and the memory object's use in the system, e.g., a field containing information for use by a resource reclamation procedure, pointers to class information in an object-oriented programming system, or synchronization information.

When a portion of memory is no longer used by any task, a "garbage collector" may be used to reclaim the unused memory so that the memory can be re-allocated to other tasks. The garbage collector may run as a separate task or process, e.g., cooperating with a separate memory allocation task or function. For example, in a Java Virtual Machine, a conventional application, memory allocation may be provided directly to tasks by a library function call, while a garbage collector runs as a separate task. Skilled practitioners will recognize that other ways of implementing a garbage collector procedure are possible, e.g., as part of the operating system, or as part of a task or process that also handles memory allocation.

In most conventional implementations, when the garbage collector needs to run, all other tasks may be suspended so that the garbage collector can run uninterrupted. However, suspending all processes for garbage collection may be unsuitable in real time systems, i.e., systems where performance of particular tasks or processes must be guaranteed to complete in a fixed time interval.

Some conventional systems implement so-called "concurrent" garbage collection. In concurrent garbage collection, a task performing garbage collection and other tasks that may access the memory may run concurrently. Systems with concurrent garbage collection may have better real-time performance for user tasks than systems that suspend all user tasks during garbage collection. However, a problem with concurrent garbage collection is dealing with any changes made to the memory by tasks running concurrently with the garbage collection procedure.

The problem of concurrent changes is illustrated in FIG. 1 and FIG. 2. In FIG. 1, object A contains a pointer to object B. Suppose a garbage collector has already completed its processing of object C, and has visited object A but not looked at A's 'children', i.e., objects referenced by pointers contained in object A, e.g., object B. Between the time the garbage collector first visits object A, and the time the garbage collector visits A's child B, another concurrently executing task may copy the pointer from object A into object C, and put some other value in object A, deleting the pointer to object B. The result is shown in FIG. 2. Now the garbage collector may never find object B, and may reach the conclusion that object B is no longer referenced and therefore is "garbage", i.e., memory to be reclaimed. In this example, however, object B is still in use by object C and thus should not be reclaimed.

Previous systems implementing concurrent garbage collection systems have relied on hardware memory management techniques to prevent mutual exclusion violations that interfere with garbage collection. For example, special bits in memory may be set so that a hardware memory management unit creates a so-called "read barrier". The memory management unit traps attempts to read from locations protected by the read barrier. In the example above, the attempt to copy the pointer from A may be trapped if all of A's children have not yet been scanned. The trap may generate an interrupt which invokes special code to be executed. Code invoked by the interrupt may update the information that is used by the garbage collection procedure related to the location protected by the read barrier. Alternatively, special bits in memory may be set so that a hardware memory management unit creates a so-called "write barrier", which traps attempts to write to protected locations. In the example above, the attempt to write to the pointer in location A before all of A's children have been scanned may be trapped by the write barrier, producing an interrupt, and allowing interrupt drive code to take action to maintain the correctness of the garbage collection procedure.

However, small low-cost microprocessors may not have hardware memory management available. Even in larger microprocessors with hardware memory management, hardware memory management may suffer from unreliable real-time response, precluding its use in real-time systems.

SUMMARY OF THE INVENTION

In accordance with an example embodiment of the present invention, a method for memory reclamation is provided that includes marking a first memory object when an attempt to alter a reference to the first memory object is detected by a software write barrier.

An example embodiment according to the present invention also provides a system that includes a software write barrier that marks a first memory objects when an attempt is made to alter a reference to the first memory object.

An example embodiment according to the present invention also provides a method that includes the steps of receiving a software module, the software module including at least one instruction that modifies a pointer, and inserting a software write barrier in the instruction that modifies a pointer.

An example embodiment according to the present invention also provides a system that includes a compiler, the compiler receiving a software module, the software module including at least one instruction that modifies a pointer, and the compiler inserting a software write barrier in the instruction that modifies a pointer.

An example embodiment according to the present invention also provides a computer-readable medium having stored thereon instructions adapted to be executed by a processor, the instructions which, when executed, define a series of steps to be used to control memory reclamation, the steps including: marking a first memory object when the first memory object is visited by a garbage collector; marking a second memory object when an attempt to alter a reference to the second memory object is detected by a software write barrier; reclaiming an unmarked memory object.

An example embodiment according to the present invention also provides a computer-readable medium having stored thereon instructions adapted to be executed by a processor, the instructions which, when executed, define a series of steps to be used to control a method, the steps including: receiving a software module, the software module including at least one instruction that modifies a pointer, and inserting a software write barrier in the instruction that modifies a pointer.

DETAILED DESCRIPTION

Figure 1:
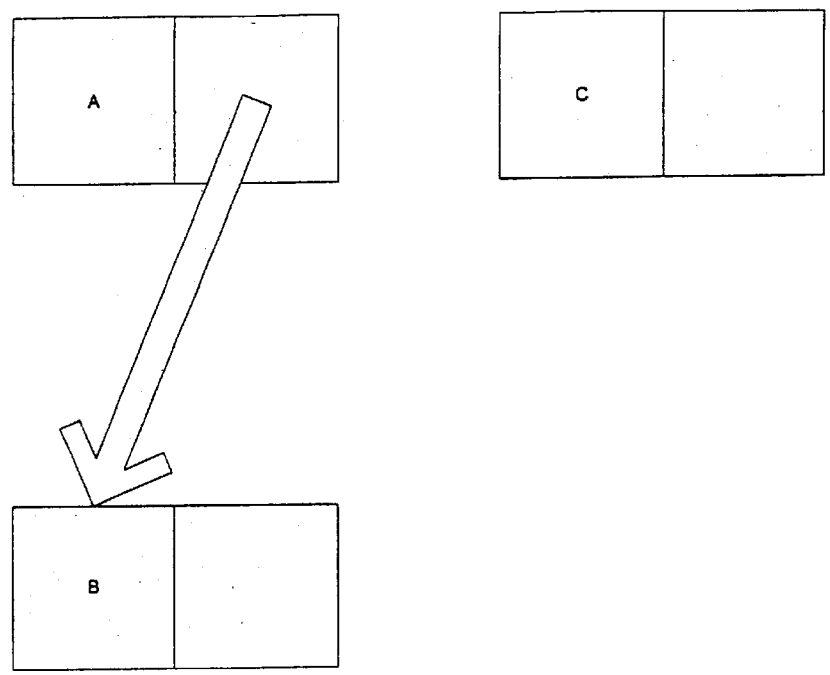
FIG. 1 illustrates several example memory locations, before the memory locations have been altered by a user task executing concurrently with a garbage collector.
Figure 2:
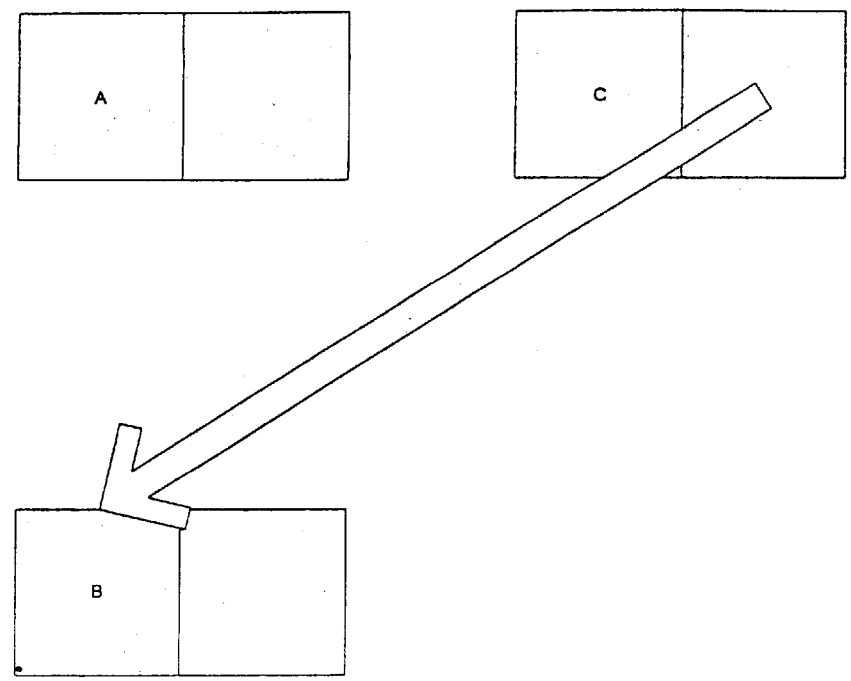
FIG. 2 illustrates the same example memory locations that are shown in FIG. 1, after the memory locations have been altered by a user task executing concurrently with a garbage collector.
Figure 3:
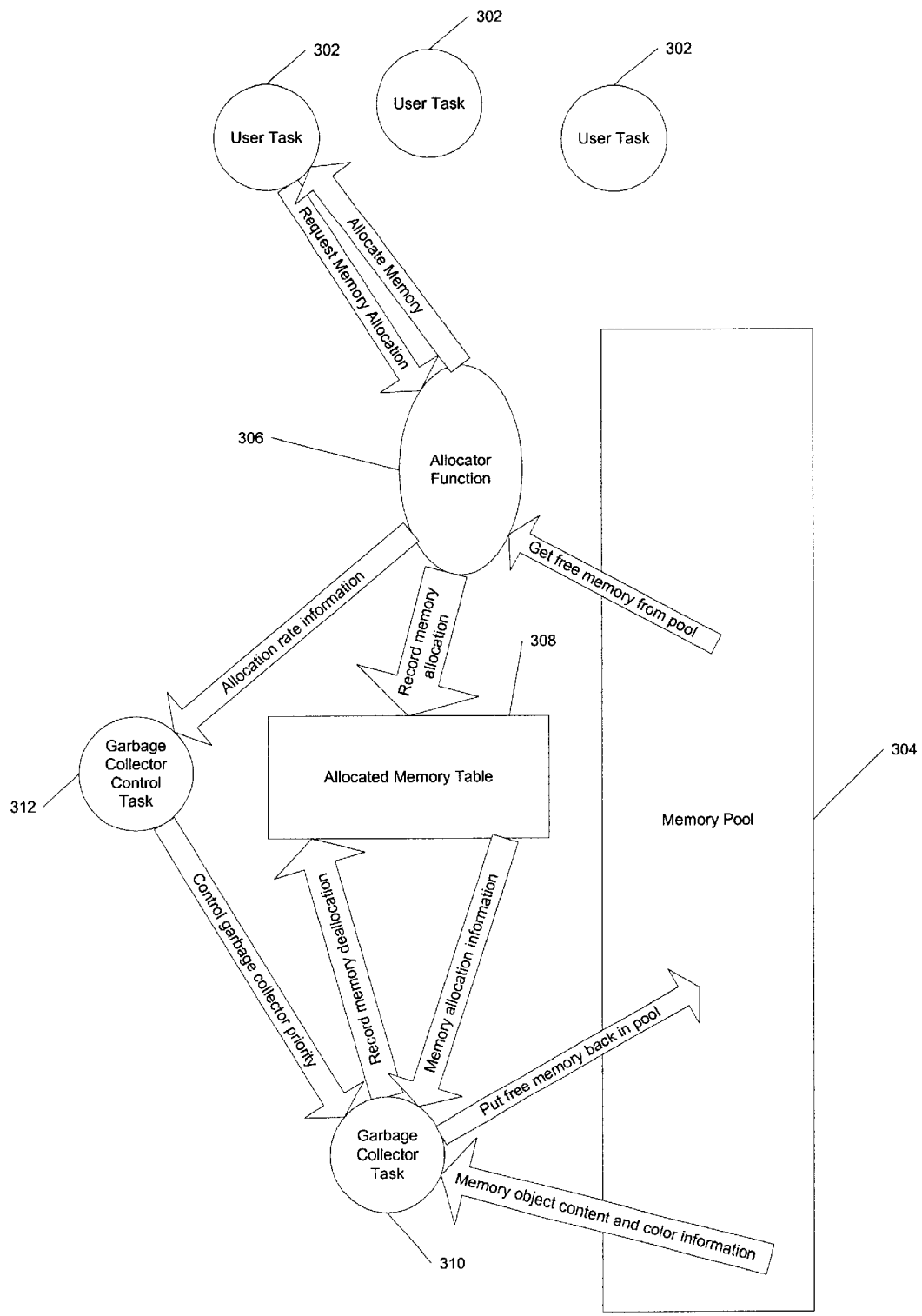
FIG. 3 illustrates the relationship between an example garbage collector task, an example allocator function, and user tasks, according to the present invention.

In an example embodiment according to the present invention, functions for controlling allocation and re-allocation of a common pool of dynamic memory shared by a group of user tasks may be implemented as part of a computer system. FIG. 3 illustrates the relationship between user tasks and functions for allocating and re-allocating a common pool of dynamic memory, according to the present invention. The example system includes a pool of memory 304, and a set of user tasks 302 that share the pool of memory 304. It will be appreciated that the present invention is not restricted to use only with user tasks. For example, the present invention may be implemented as part of the operating system, or for any other situation where a group of tasks share a common pool of memory. It will also be appreciated that "memory" may include any writeable storage medium that may be used by the tasks (e.g., RAM memory, other semiconductor memory, bubble memory, disk, etc.).

While a task is executing, the task may request that additional dynamic memory be allocated, e.g., by invoking an allocation library function call to a library allocator function 306. The library allocator function may return a pointer to an allocated memory object of the requested size from the memory pool 304. The library allocator function 306 may update an allocated memory table 308 to reflect the allocation of memory to the task, e.g., by adding an entry in the allocated memory table reflecting the location of a memory object allocated to the task.

In the example embodiment, static memory may also be allocated to a task, e.g., by the operating system when the task is loaded. The system may also include global memory, e.g., a static heap. Global memory locations may include locations not allocated to a particular task and that may be directly accessed by all tasks in the application. Tasks may also be allocated one or more registers. Tasks may also have a stack (or "run-time stack") or alternatively tasks may share space in a common run-time stack. A task's stack may be used to save "local" variables that are used in a task. The contents of the task's registers may also be saved on the task's stack, e.g., when execution of the task is interrupted. In the example embodiment, static memory, global memory, registers, and stack space are not part of the shared memory pool. However, skilled practitioners will recognize that the example embodiment may readily be modified to control the allocation and de-allocation of static memory, of stack space, or of global memory.

A task in the example embodiment may release memory that has been previously allocated to the task. For example, memory may be released if the task ceases to exist, or if the task is simply no longer maintaining any references to the memory. The system may also allow a task to explicitly free a memory object allocated to the task, e.g., by executing a special function call. However, it should be noted that, simply because the task that was originally allocated a memory object subsequently ceases to use the memory object or even explicitly releases it, the memory may not automatically be available for reallocation. The task may have passed a pointer or reference to the memory object to some other task, and the other task may still be using the memory object. Accordingly, the memory object may be unavailable for re-allocation until there are no tasks using the memory object.

The example embodiment may include a procedure (described in detail below) for identifying "free" memory that may be reclaimed and re-allocated to other tasks, e.g., by checking that no tasks are currently using a piece of memory, before the memory is made available for re-allocation. The identification of memory that is no longer in use and is available for re-allocation may be performed by a "garbage collector" task 310, or by some other mechanism for checking and reclaiming memory, e.g., by other tasks, or by functions provided by the operating system.

In the example embodiment, the garbage collector task 310 runs as a separate task. The garbage collector may be invoked when the application begins execution, e.g., at library start-up in an object-oriented application such as a Java Virtual Machine. The garbage collector task may run constantly, executing concurrently with user tasks. The garbage collector may use information from the allocated memory table 308 and from scanning the shared memory pool 304 in order to determine memory objects that are available for reclamation. The garbage collector may delete the corresponding entries from the allocated memory table 308 and make the memory available for reallocation, e.g., by adding the memory to a free memory table, or by invoking a system or library function call that frees the memory objects that the garbage collector task has identified.

In the example embodiment, the memory objects that are freed for reclamation by the garbage collector are the same as the memory objects that were originally allocated, i.e., allocated memory objects are atomic. Skilled practitioners will appreciate that the example embodiment may be modified to use non-atomic memory reclamation; however, this modification may require that the allocated memory table, or some other structure or task, be used to adjust the recorded size and location of memory objects that are partially reclaimed. This may also require that new objects be created by the garbage collector, e.g., if memory in the middle of an existing object were reclaimed, creating two objects at either end of the existing object.

The example embodiment also may include an example garbage collector control task 312. The garbage collector control task 312 may control the time and duration that the garbage collector task 310 executes.

Garbage Collector Control and Scheduling

In an example embodiment according to the present invention, a garbage collector task may run concurrently with other tasks in an application. A garbage collector control task may be used to determine when and for how long the garbage collector task runs, and to help maintain mutual exclusion between the garbage collector task and user tasks, when such mutual exclusion is advantageous.

The garbage collector control task may include a scheduling algorithm to determine how often and for how long the garbage collector task runs. Any conventional scheduling method may be employed, e.g., a periodic schedule where the garbage collector is run at a fixed periodic interval, or an adaptive, event-driven schedule where the garbage collector is run when available free memory falls below some threshold. When scheduling the garbage collection task, the garbage collector control task may need to balance the rate of memory allocation in the application with the desired real time response for user tasks in the application. Information about the rate of memory allocation may be communicated to the garbage collector control task by the allocator function. The faster memory is allocated, the more often garbage collection may be needed. Conversely, the faster real-time response that is required from user tasks, the shorter the duration that the garbage collector may be allowed to run uninterrupted. In order to appropriately balance real time response and rate of memory allocation, the garbage collector control task may be tuned for the particular system and workload where the garbage collector is implemented. Skilled practitioners will recognize that any conventional method of tuning the garbage collector schedule may be used to determine appropriate settings for the garbage collector control task given a particular set of system parameters and workload.

The example garbage collection control task may use a priority control scheme included in the example embodiment to help control the execution of concurrent tasks, including the garbage collector task, as well as system and user tasks. Any conventional method of implementing a priority control scheme may be employed. In a priority control scheme, tasks may be assigned a priority value, ranging from lowest to highest. When multiple tasks contend for resources, a higher priority task generally receives more resources from the system than a lower priority task. A system using a priority control scheme may not force a higher priority task to wait for a lower priority task to complete, but instead may preempt the lower priority task until the high priority task either terminates or has its priority lowered.

The example embodiment includes a so-called "absolute" priority scheme. In an "absolute" priority scheme, lower priority tasks do not interrupt higher priority tasks. A higher priority task receives all available system resources until it completes, or until an even higher priority task interrupts the first task. Thus, in the example embodiment, high and low priority tasks will not run concurrently, achieving mutual exclusion while the higher priority task is executing.

Figure 4:
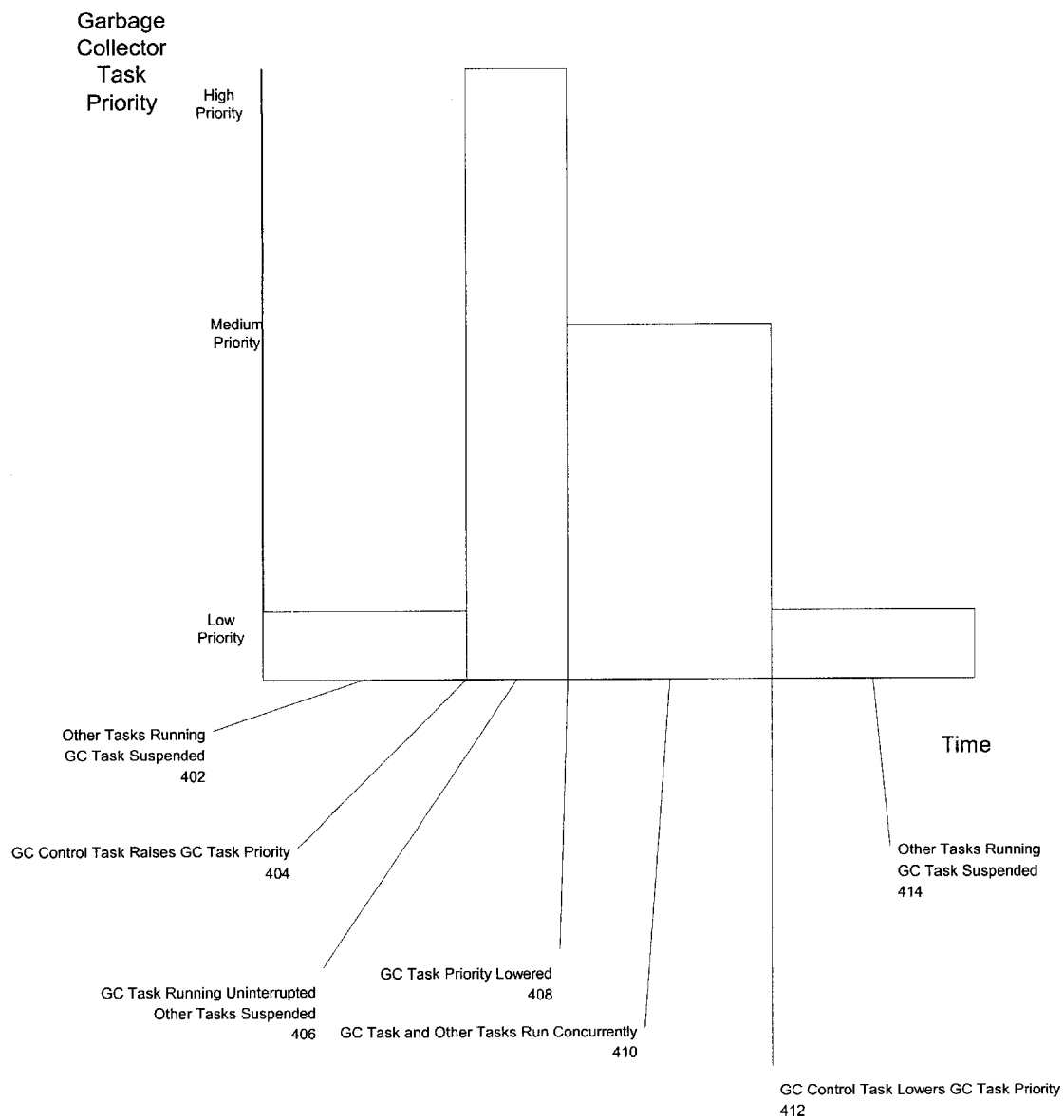
FIG. 4 illustrates an example use of priority to control scheduling and mutual exclusion for an example garbage control task, according to the present invention.

FIG. 4 illustrates the use of the priority control scheme to control an example garbage collector task, according to the present invention. Initially, the garbage collector may have a low priority, as shown at 402. When the garbage collector has a low priority, the garbage collector may be suspended while other higher priority tasks in the system are executing. To run the garbage collector task, the garbage collector's priority may be increased by the garbage collector control task, as illustrated at 404.

It may be desirable for the garbage collector to run uninterrupted during certain parts of the garbage collection procedure. When the garbage collector runs at high priority, as shown at 406, other lower priority tasks may be suspended, and the garbage collector may run uninterrupted. The priority of the garbage collection task may be raised to a level just below the highest possible level allowed in the control scheme, permitting only special extremely high priority tasks to interrupt garbage collection. Code may be included in the garbage collector task and garbage collector control task to handle interruptions by a higher priority task. In the example embodiment, this code restarts the scan of tasks' stacks if the garbage collector is preempted by a higher priority task. Alternatively, other conventional methods could employed in order to insure the conservativeness of the garbage collection procedure when the procedure is interrupted, e.g., the garbage collector control task may restart the garbage collection procedure from scratch when it resumes execution.

When the garbage collector no longer needs to run uninterrupted, the garbage collector priority may be lowered, as shown at 408. If the garbage collector and user tasks have similar priorities, they may execute concurrently. In the example embodiment, when the garbage collector runs at a medium priority, as shown at 410, the garbage collector and other tasks may run concurrently. To stop the garbage collector task, e.g., when the garbage collection procedure has been completed, the priority of the garbage collector may be lowered, as shown at 412. When the garbage collector control task is low, as shown at 414, the garbage collector may again be suspended until the garbage collector priority is raised or the system is not busy.

Skilled artisans will appreciate that alternative methods of controlling the execution of the garbage collector task may be employed, e.g., any conventional method of task control such as signals or semaphores.

Example Garbage Collection Procedure

Figure 5:
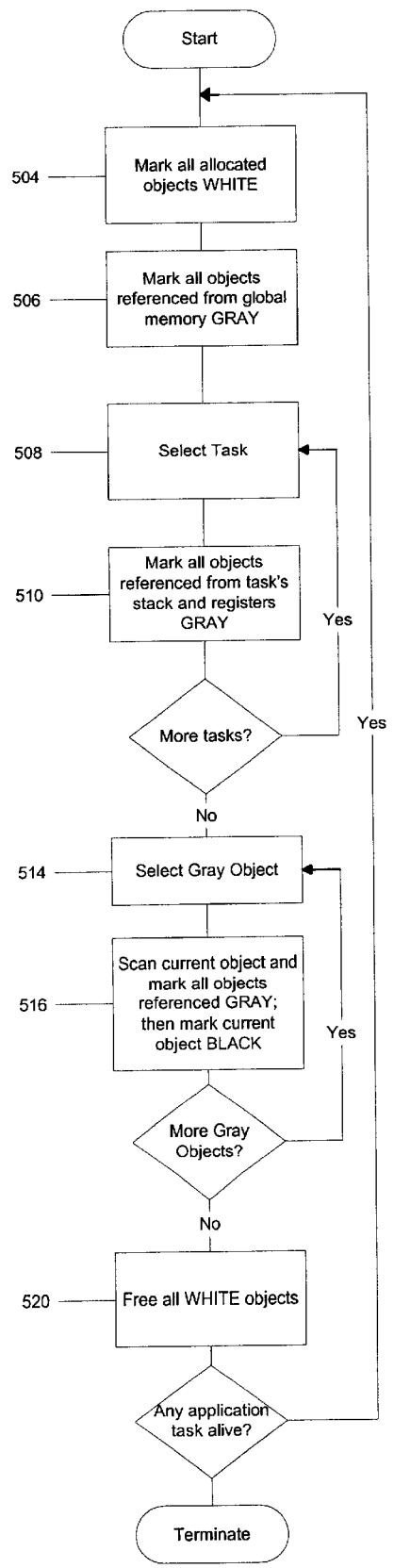
FIG. 5 illustrates a flowchart for an example procedure for garbage collection, according to the present invention.

FIG. 5 illustrates an example procedure for garbage collection, according to the present invention. This example procedure may be performed by a garbage collection task, by the operating system, or by other tasks with the ability to access and examine the shared pool of memory.

The example procedure may use three marks, denoted "black", "white", and "gray", to indicate the status of memory objects. These marks may be represented by two bits, e.g., "00" may represent black, "01" may represent gray, and "11" may represent "white". In the example embodiment, marks are stored as part of garbage collection information data structure associated with each memory object. Alternatively, memory objects may be marked by any other conventional method, e.g., by creating a table in a garbage collector task's local memory with an entry for each allocated memory object or by including a marking field at a known location in each memory object.

A black mark may denote a memory object that may be in use and thus should not be reclaimed by the garbage collector, and that the garbage collector has finished processing. For example, a memory object that has been visited by the garbage collector, and all of whose children have also been visited during the garbage collection procedure may be marked black. A gray mark may denote a memory object that may be in use, and that should not be reclaimed by the garbage collector. For example, a memory object that has been visited during the garbage collection procedure, but all of whose children have not yet been visited during the garbage collection procedure may be marked gray. A gray mark may also be used to mark a memory object that although it has not yet been visited, has had a reference to it altered, e.g., by a task running concurrently with the task performing the garbage collection procedure. Newly-allocated objects may also be marked gray. A white mark may denote an object that is not known to be in use, e.g., an object that has not been visited during the garbage collection procedure and that has not had a reference to it altered. At the end of the garbage collection procedure, objects still marked white may be available for re-allocation. For example, if allocated memory and free space tables are used, memory objects that are garbage may have their entries removed from the allocated memory table and entries added to the free space table.

In step 504, all allocated memory objects in the application are marked white. The allocated objects may be identified by scanning the allocated memory table.

In step 506, the garbage collector visits all "global" memory locations in the application. All memory objects referenced by pointers found in global memory locations are colored gray. In the example embodiment, global memory may be implemented in a way in which the "type" of entries in global memory is known, e.g., the global memory may include information for strong type checking. This strong type checking allows pointers in the global memory to be readily identified. Alternatively, a "conservative" procedure may be used to identify possible pointers in global memory locations. A "conservative" procedure for identifying pointers may err by identifying the contents of a memory location as a pointer when the contents are not a pointer, but never errs by classifying the contents of a memory location as not being a pointer when the contents of the memory location is a pointer. An example of a conservative procedure for detecting potential pointers that may be used is the two-test approach used for testing whether a task's registers are pointers, described below in connection with step 510.

In step 508, a task is selected. In step 510 the selected task's registers may be scanned. Also in step 510, the stack of the selected task's stack may be copied into a local memory array of the garbage collector, and then scanned. Alternatively, the garbage collection procedure may read the stack of the selected task directly, rather than copying it into local memory.

Each "entry", i.e., either the contents of one of the task's registers or the contents of a word in the task's stack, may be tested to determine whether the entry is a pointer. In the example embodiment, two tests may be performed to identify if the entry is potential pointer. First, the entry is interpreted as a pointer. The entry is tested to see if, when interpreted as a pointer, the entry points anywhere within the dynamic memory allocated to the application. If the entry does not point anywhere within the dynamic memory (e.g., because it is an invalid address, or if it is a valid address, because it points outside the dynamic memory allocated to the application), the entry is determined not to be a pointer, and no further action is taken with that entry. Second, the entry, interpreted as a pointer, is tested to see if it references an address within any allocated memory object. If the tested entry, interpreted as a pointer, does not point to an address within any of the allocated memory objects, the entry is determined not to be a pointer, and no further action is taken with that entry. However, if the tested entry, interpreted as a pointer, does point to an address in an allocated memory object, and the memory object that contains the address referenced by the entry is currently marked white, then the memory object is marked gray.

The tested entry, interpreted as a pointer, references an address within an allocated memory object only if the referenced address lies somewhere between the base address of the memory object, and the end of the memory object. The end of the memory object may be determined by adding the object's size to its base address. Because the referenced address can only lie within the memory object with the highest base address that is less than the referenced address, skilled practitioners will recognize that this test may be accomplished more efficiently if the allocated memory table is stored in sorted address order, or in some other data structure that allows the memory object to be found rapidly in a search by address, e.g., a binary tree keyed by object address.

The procedure of steps 508–510 is repeated for each task. It will be appreciated that the order of step 506 and step 508 may be interchanged, i.e., the global memory may be scanned after tasks' stacks and registers.

In step 514, a memory object marked gray is selected. In step 516, the selected gray memory object is scanned to identify all possible pointers in the object. References to other memory objects contained in the selected gray memory object may be readily identifiable, e.g., if strong typing requires such pointers be explicitly identified. If an identifiable pointer in the selected gray memory object references an allocated memory object, e.g., points to an address in an allocated memory object, and the allocated memory object is currently marked white, then the allocated memory object's mark is changed to gray. Alternatively, if strong typing does not allow the explicit identification of pointers in the selected gray memory object, each word in the selected gray memory object may be checked to see if the word may potentially be a pointer to an address in an allocated memory object. This check may be accomplished using the two tests described above in step 510. If a word in the selected gray memory object, interpreted as a pointer, does point to an address in an allocated memory object, and the allocated memory object is currently marked white, then the allocated memory object's mark is changed to gray. When this procedure is completed for all the entries of the selected gray memory object, the selected gray memory object is marked black.

Steps 514–516 are repeated until all gray memory objects in the system have been scanned.

When no more gray memory objects can be found, in step 520, all white memory objects may be reclaimed for reallocation. This may be accomplished by removing the white memory objects from the allocated memory table and adding the memory objects storage space to a free memory list, or by other conventional method, e.g., by invoking a special library function call that makes the memory object available for reallocation.

Skilled artisans will recognize that the steps of the example garbage collection procedure, described above, could be defined as a series of instructions adapted to be executed by a processor, and these instruction could be stored on a computer-readable medium, e.g., a tape, a disk, a CD-ROM.

In the example embodiment according to the present invention, the garbage collection procedure may be executed concurrently with other tasks in the system. Concurrency control and mutual exclusion techniques may be used to allow the garbage collection procedure to run correctly and conservatively even though other tasks, running concurrently with the garbage collector, may attempt to alter global memory or memory objects while the example garbage collection procedure illustrated is underway. The example embodiment includes at least two forms of concurrency control and mutual exclusion techniques: the priority system and software write barriers.

Figure 6:
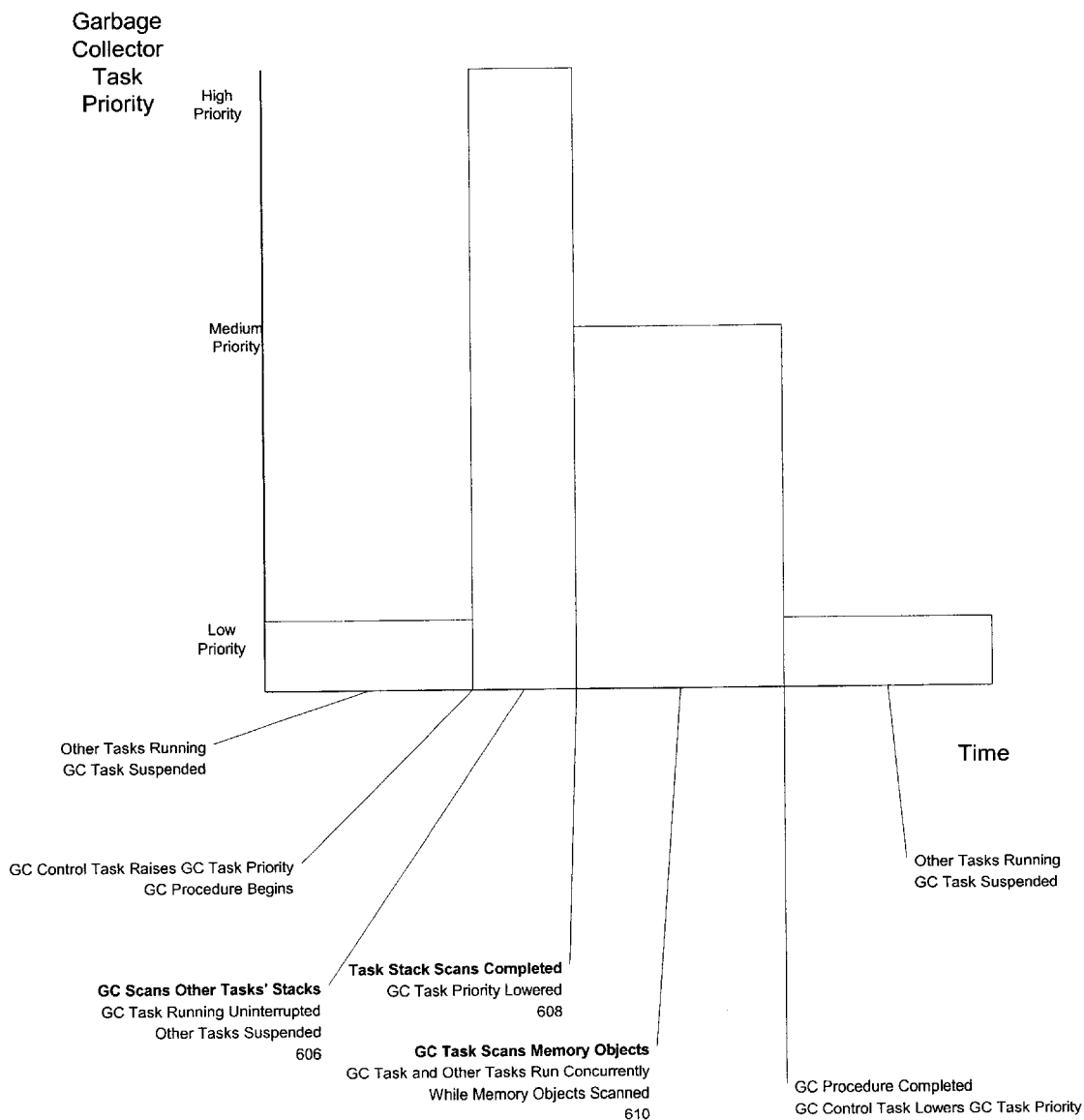
FIG. 6 illustrates an example use of priority to control scheduling and mutual exclusion for an example garbage control task during various steps of the example procedure for garbage collection, according to the present invention.

FIG. 6 illustrates the use of the priority system to provide concurrency control in the example embodiment according to the present invention. As shown at 606, the priority system may be used to insure the scanning of tasks' stacks and registers is performed atomically, without interruption. The garbage collector control task may achieve mutual exclusion between the garbage collector task and user tasks using an absolute priority control scheme, by setting the priority of the garbage collector task sufficiently high that it will not be interrupted by user tasks. If the garbage collector: task's priority is raised high enough, user tasks will be suspended while the garbage. collector task scans tasks' stacks and registers. Once all of the global objects and all tasks' stacks and registers are scanned and processed by the garbage collector task, the garbage collector task's priority may be lowered, as shown at 608. While the garbage collector task scans allocated memory objects, less strict concurrency control may be required. As shown at 610, the garbage collector may have the same priority as user tasks. Thus, the garbage collector task and user tasks may run concurrently, as shown at 610. Allowing the garbage collector task and user tasks to run concurrently may improve the real time performance of user tasks.

It will be appreciated the scan of all the global memory and tasks' registers and stacks may not need to be atomic. Scanning the global memory, and all tasks' stacks and registers at high priority is a simple method to insure that each individual task's stack is scanned atomically. However, skilled practitioners will recognize that other slightly more complicated approaches may be employed. For example, the garbage collector control task may interrupt the garbage collection process between each task stack scan to allow user tasks to run, improving real time task response time, but potentially decreasing garbage collector performance.

It will also be appreciated that, compared to the scanning of all allocated memory objects, the scanning of tasks' registers and stacks may be a relatively short process. For example, in a system using a language such as Java, calls are by reference only. Thus, tasks' stacks are relatively short. Skilled practitioners will recognize that an alternative approach may be used that allows other tasks to run concurrently while the garbage collection task scans a task's stack, e.g., re-starting the scan of a task's stack when the scan has been interrupted, or using some form of read or write barriers on task stacks, although such approaches may have negative performance impact on other aspects of the system.

Skilled practitioners will recognize that some systems may include exceptions to pure absolute priority, e.g., to help avoid deadlocks. For example, when a high priority task is waiting for a resource to be freed by a low-priority tasks, the priority of the lower priority task may be raised to allow it to complete and free the resource. Thus, other methods of achieving mutual exclusion, besides the priority system, may need to be included in such systems to insure a correct and conservative garbage collection procedure. For example, write barriers, discussed below, may be used. Skilled practitioners will recognize that any other conventional method of achieving mutual exclusion between the garbage collector task and other tasks may be used, e.g., semaphores, control blocks, etc.

Write Barrier Method

In the example embodiment, user tasks may be allowed to interrupt the garbage collector task during the garbage collector task's scanning and processing of allocated memory objects. Interruptions may also be allowed during the scanning of global memory. In a system where the garbage collection task may be interrupted by other tasks or where other tasks may alter memory locations already scanned or marked by the garbage collector, it may be useful to implement a procedure that maintains the correctness of the garbage collection, even when the garbage collection task is interrupted or changes are made to global memory or allocated memory objects.

Figure 7:
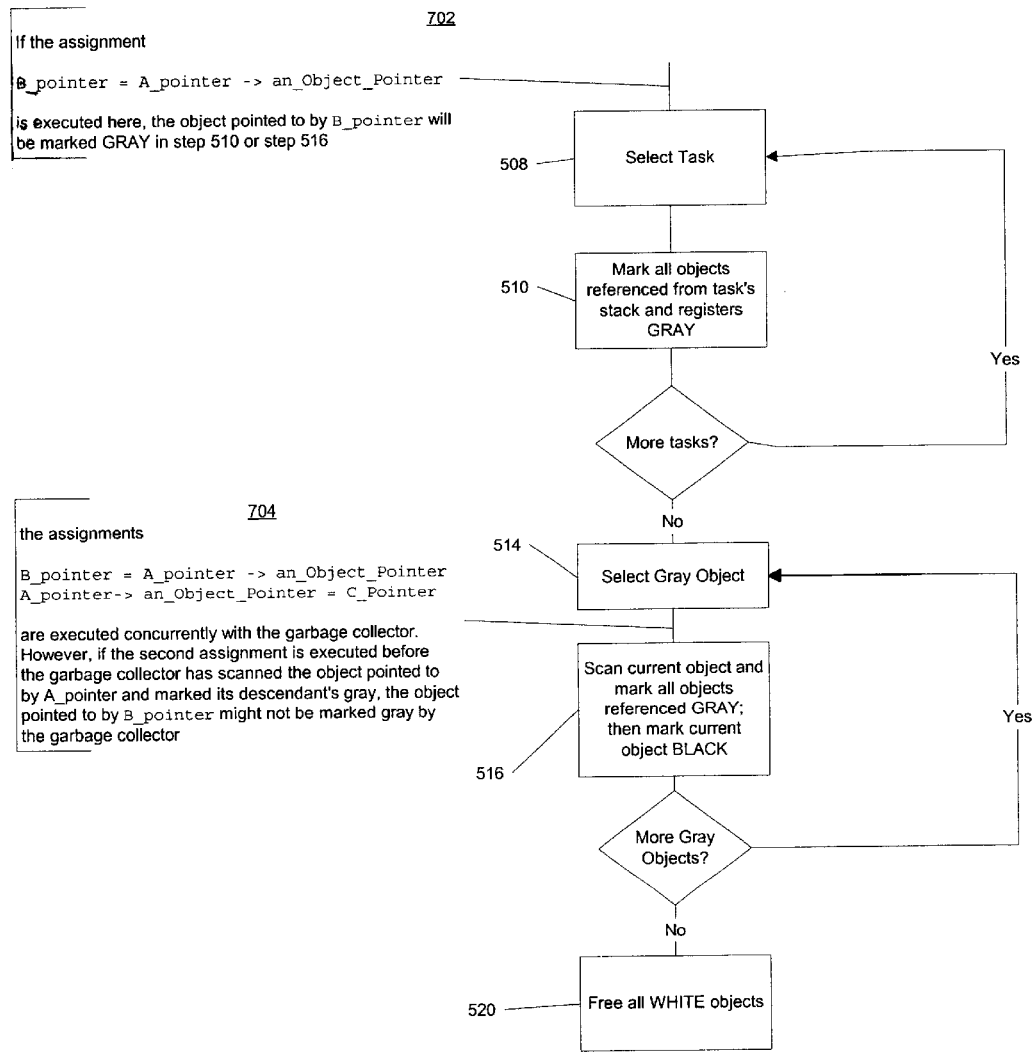
FIG. 7 illustrates an example user code fragment that may execute concurrently with an example garbage collection procedure.

FIG. 7 illustrates the possible effect of altering memory objects while the garbage collection procedure is underway. In this example, the following code fragment is executed in a system concurrently with the garbage collection procedure.

B_pointer=A pointer→an_Object_Pointer

A_pointer→an_Object_Pointer=C_Pointer

SomeUsage(B_pointer)

Here, A_pointer, B_pointer, and C_Pointer are all pointers or references to memory objects. Assume A is the memory object referenced by A_pointer and an_Object_Pointer is a pointer contained in memory object A. The first line of the code fragment sets B_pointer to reference the same memory object referenced by the pointer an_Object_Pointer contained in A. In line 2 of the code fragment, the pointer an_Object_Pointer contained in A is changed to reference some other memory object (i.e., C_pointer). SomeUsage (B_pointer) is a subsequent use of the object referenced by B_pointer.

If only the first line of the example code fragment is executed at point 702 in FIG. 7, the garbage collection procedure (described previously in connection with FIG. 5) may subsequently mark the object referenced by B_pointer. For example, this marking may occur in step 516 when object A is scanned, and its children, including the object referenced by B_pointer, are marked gray. However, if the entire example code fragment is executed by a user task running concurrently with the garbage collection procedure, and the second line of the code is executed at point 704, then there is no guarantee the garbage collection procedure will visit the object referenced by 'B_pointer', e.g., because the reference in the object A may already have been altered before the object A is scanned by the garbage collector.

In the example embodiment according to the present invention, a "write-barrier" may be used to prevent the garbage collector from erroneously reclaiming an object. In particular, when a task attempts to remove or alter a pointer to an object and the object is currently marked white, the write-barrier marks the object gray. Skilled practitioners will appreciate that the write-barrier may be used to take other actions in response to an attempt to modify a reference to an object, e.g., the "write-barrier" may prevent modification of an object previously visited by the garbage collection procedure, or the write-barrier may use some other method to inform the garbage collector of the modification.

In the example embodiment, a modified compiler may be used to automatically generate software code for write barriers. This modified compiler may be used to compile the code for user tasks. The compiler identifies instructions in a software module that may alter or delete a reference to a memory object. These instructions may include assignments to pointers, or other types of instructions with side effects. The compiler then modifies the code, inserting additional instructions to implement a write barrier. The write barrier code may test whether the referenced object has previously been visited during the garbage collection procedure. If the referenced object has not been visited (i.e., it is currently marked white), the mark may be changed to gray.

For example, given the instruction

A_pointer→object_pointer=C_pointer;

The compiler may substitute the code

If (A_pointer→object_pointer!=NULL) then
Make_GRAY_If_WHITE(A_pointer→object_pointer);
A_pointer→object_pointer=C_pointer;

In the example embodiment, Make_GRAY_If_WHITE is a function that tests whether the color of the mark of the object referenced by A_painter→object_pointer is white, and if the mark is white, the mark is changed to gray. The referenced object may in fact no longer be referenced, i.e., it may be garbage. If the referenced object is garbage, it may be detected by the garbage collector task in a subsequent execution of the garbage collection procedure.

Altering the marking of the referenced object may help insure that the garbage collection procedure runs conservatively. For example, in the code fragment example given above and shown in FIG. 7, this code substitution will result in the object referenced by B_pointer being marked gray before the reference in the object referenced by A_pointer is altered or deleted. This may prevent an erroneous reclamation of the object referenced by B_pointer.

It will be appreciated that other implementations of write barriers according to the present invention may be achieved without the use of a compiler or compiler modification, e.g., a tool may be used to insert write barriers in code. In an interpreted language, write barriers may be automatically executed by the interpreter. It will also be appreciated that the implementation of write barriers in the example embodiment may be simplified by the fact that the language used in the example embodiment is strongly typed, allowing easy identification of references. However, skilled artisans will recognize that the present invention may be implemented for more weakly typed languages, e.g., by treating all instructions that potentially are pointers as pointers, and conservatively marking the corresponding memory objects gray, even if corresponding object may in fact not be referenced.

Example Memory Allocation and De-Allocation

The example embodiment includes procedures for allocating memory, and for reclaiming memory that has been identified by the garbage collector task. Memory in the example embodiment is allocated to tasks atomically, i.e., a portion of memory or "object" that has been allocated to a task can only be reclaimed for reallocation in its entirety. Skilled practitioners will appreciate that modifications may be made to allow non-atomic memory allocation, garbage collection, and de-allocation, e.g., by keeping more extensive records of memory that has been allocated and de-allocated.

Memory Allocation

In the example embodiment, a task may request that a dynamic memory object be allocated by invoking an "allocator" function. The allocator function may be provided as a library function for the application, as a system call to the operating system, or by other conventional mechanism. A task requiring an allocation of memory may invoke the allocator function with an argument that indicates the size of the memory block required. Alternatively, in an object-oriented system, the allocator function may be invoked by requesting an object of a particular type or "class", with the size information obtained from a type or class definition. In satisfying an allocation request two data structures may be used, e.g., a table of free memory available, and a table of allocated memory objects.

The allocator function may first search a table of free memory in order to identify a suitable portion of available memory. If no suitable memory is available, a request may be made to the operating system to allocate additional memory to the application. The garbage collection procedure may be initiated in order to reclaim memory. Alternatively, an exception condition may be returned, indicating that suitable memory is not available.

If a suitable portion of memory is available, the entry for the space to be allocated for the allocated memory object may be removed from the free memory table and the memory object may be added to the allocated memory table. A pointer to the newly allocated portion of memory may be returned by the allocator function. If the memory is not recorded in the free memory table in object form, a new memory object may need to be created using the selected portion of memory, e.g., by using an appropriate library function call. If information about the memory object (e.g., its size) is stored in the memory object, this information may need to be updated. Alternatively, any information about the memory object that is stored in the allocated memory table may also need to be updated. Finally, a pointer or reference to the memory object may be returned as a result of the function call that invoked the allocator.

Memory Reclamation

To reclaim memory in the example embodiment, the garbage collector task may invoke a library function call to free a memory object that the garbage collector task has identified as unused. The library function call may delete the memory object's entry in the allocated memory table and update the free memory table to include the memory object's portion of memory. Skilled practitioners will recognize that other functions may also be performed by the library function call used to reclaim a memory object, e.g., the contents of the memory object may be cleared, contiguous free memory objects may be merged, etc. Skilled practitioners will also recognize that other conventional mechanism of memory reclamation may be used instead of a library function call, e.g., a call to the operating system, or code included in the garbage collector task.

Free Memory Table

The example embodiment may include a free memory table, e.g., for use by the allocation and reclamation function described above. The free memory table may indicate contiguous blocks of memory available for allocation. Alternatively, the free memory table may contain a list of pre-defined memory objects available for allocation.

Figure 8:
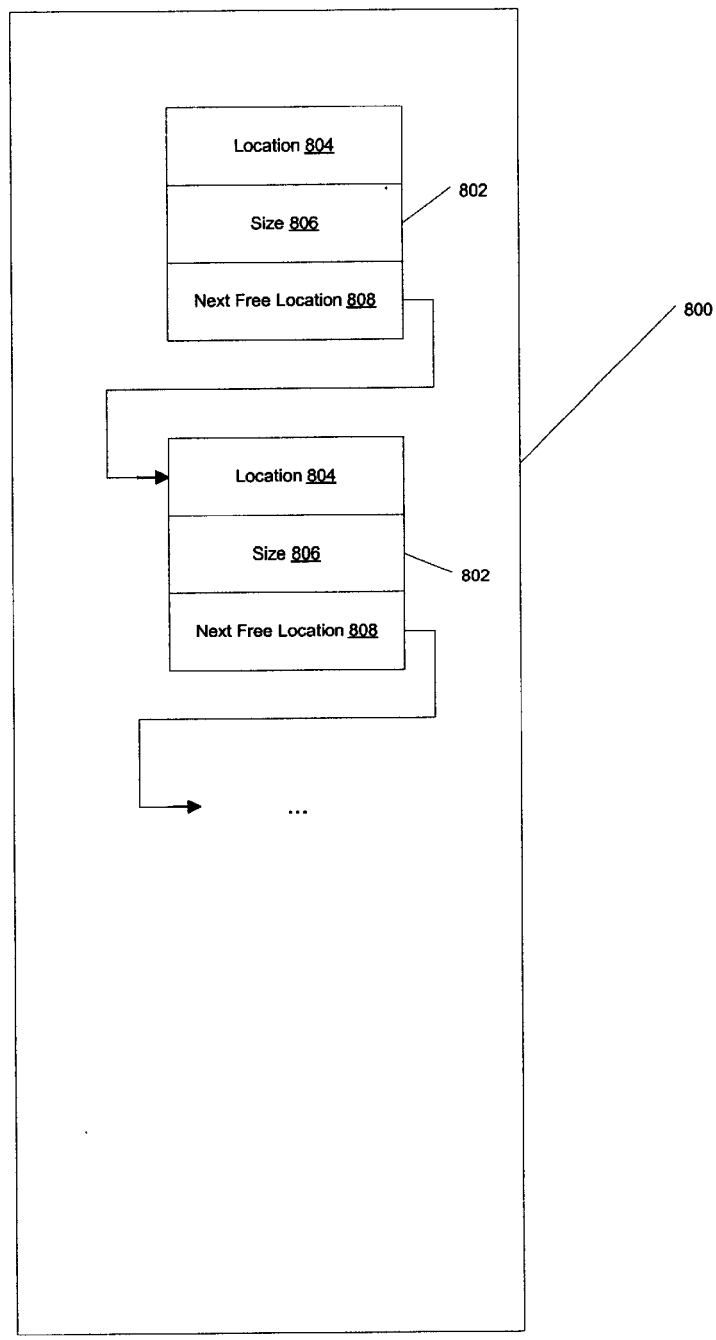
FIG. 8 illustrates an example free memory table, according to the present invention.

FIG. 8 illustrates an example free memory table 800, according to the present invention. The example free memory table may include entries 802 corresponding to free blocks of memory that are available for allocation. Each entry in the example free memory table may contain a pointer, reference or address 804 to the corresponding free area of a memory. Each entry 802 may also include a field 806 indicating the size of the free memory object. Each entry 802 may also include a pointer 808 to the next entry in the free memory table. If the allocated free memory table is implemented as a linked list, the list may be "null terminated", i.e., the last entry may point to a special "null" pointer to indicate the end of the linked list.

Skilled practitioners will recognize that other information may be stored in each entry of the free memory table, e.g., a class type for a pre-defined free memory object.

The free memory table may be stored in any convenient data structure, e.g., a heap, an array, etc. It may also be useful to sort or otherwise organize the free memory table so that memory objects of a particular size can be readily found in accordance with any conventional memory allocation procedure, e.g., stored in a binary tree keyed by the size of the free memory block to facilitate a best-fit or worst-fit storage allocation scheme.

Allocated Memory Table

Figure 9:
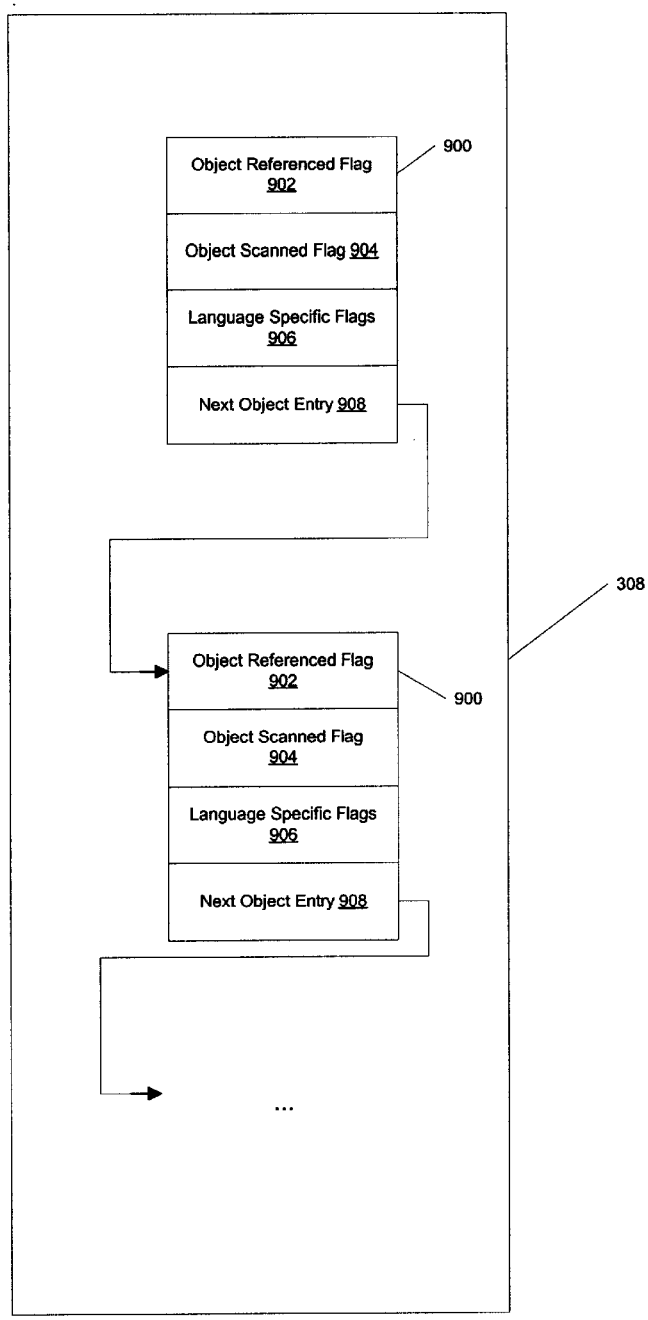
FIG. 9 illustrates an example allocated memory table, according to the present invention.

The example embodiment may include an allocated memory table to track allocation of memory in the shared memory pool. FIG. 9 illustrates an example allocated memory table, according to the present invention. The example allocated memory table 308 may be implemented as a linked list of entries 900. Each entry 900 in the allocated memory table may correspond to a memory object that has been allocated. It will be appreciated that the memory allocation table entries may alternatively be stored in any conventional data structure, e.g., a hash table, or a heap, or a binary tree keyed the memory address of the corresponding memory objects.

Each entry 900 in the allocated memory table may contain one or more fields describing the corresponding allocated memory object. In the example embodiment, entries in the allocated memory table are contained in the corresponding allocated memory objects, e.g., in a garbage collection information data structure contained in the memory object. Skilled practitioners will recognize that any other mechanism may be used that uniquely associates the entries with the memory objects and that allows the location of allocated memory objects, e.g., the entries in the allocated memory table may be stored in a separate data structure and each entry may include the base address and offset of the corresponding memory object.

In the example embodiment, each entry 900 may include a variable indicative of whether the corresponding memory object is in use or is available for reclamation, e.g., a referenced flag 902. This flag may be set "true" when the corresponding memory object is marked gray or black in the example garbage collection procedure, and set "false" when the corresponding memory object is marked white. It will be appreciated that placing the referenced flag first in the allocated memory table entry may speed the execution of the test that may be used in compiler-generated write barriers, described previously. It will also be appreciated that other methods of indicating whether a memory object is available for reclamation may be used.

In the example embodiment, each entry 900 may include a variable indicative of whether the garbage collector has completed its processing of the corresponding memory object, e.g., a scanned flag 904. The scanned flag 904 may be used in the example garbage collection procedure to indicate whether all children of the memory corresponding memory object have been visited by the garbage collector. The scanned flag 904 may be set "true" when the corresponding memory object is marked "black" in the example garbage collection procedure, and may be set "false" when the corresponding memory object is marked "white" or "gray" in the example garbage collection procedure. It will also be appreciated that other methods of indicating whether the garbage collector has completed its processing of a memory object could be used.

In many systems, variables used as flags are "false" when set to zero and "true" otherwise. However, in the example embodiment, for referenced flag 902 and scanned flag 904, true is denoted by zero and false by any other value. On many processors, clearing a variable by setting it to zero may be accomplished with a single machine instruction, e.g., by moving the contents of a zero-valued register to the location of the variable, or by a special clear variable instruction. Implementing the scanned and referenced flags with true denoted by zero, may allow the Make_GRAY_ If_WHITE ( ) function, described above, to be implemented as a single machine instruction that clears the value of the scanned flag for a memory object. This implementation may improve the efficiency of software write barriers.

In the example embodiment, each entry 900 may also include a field for language-dependent flags 906.

In the example embodiment, each entry in the example allocated memory table may also include a pointer or reference 908 to the next memory object in the allocated memory table. If the allocated memory table is implemented as a linked list, the list may be "null terminated", i.e., the last entry may point to a special "null" pointer to indicate the end of the linked list.

Skilled practitioners will recognize that the information about allocated memory objects may not need to be stored in the memory objects themselves, but may be stored in a global table or array that is available to functions performing memory allocation and reclamation. If the entries in the allocated memory table are stored in a separate data structure as opposed to in known positions in the corresponding memory objects, the entries in the allocated memory table may need to include a pointer or other mechanism for uniquely identifying and locating the corresponding memory object. If allocated memory table entries include references to the corresponding objects, the pointer 908 may point directly to the next entry in the allocated memory table, as opposed to the next allocated object. The use of a conventional array or other indexed data structure for storing such a global table may eliminate the need for a pointer to the next entry in the allocated memory table.

Skilled practitioners will recognize that other fields may be added to the garbage collection information data structure used in the allocated memory table. For example, in the example embodiment each object has an associated "class definition"; memory object size may be determined using system or library call or by examining the size entry in a class definition. Information about memory object size may alternatively be stored in each entry of the allocated memory table. Skilled practitioners will also recognize that alternative mechanism maybe used to indicate the size of each allocated memory object in the corresponding entry in the allocated memory table, e.g., an offset to the last entry of the memory object, the memory object's size in bytes, etc.

Modifications

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

What is claimed is:

1. A method of memory reclamation, comprising:
    markings a first memory object as in use when an attempt to alter a reference to the first memory object is detected by a software write barrier;
    marking a second memory object as in use when the second memory object is visited by a garbage collector;
    reclaiming a third memory object marked not in use; and
    lowering a priority level of a garbage collector when the reclamation of the third memory object has been completed.

2. The method according to claim 1, further comprising:
    reading the contents of a stack, the stack containing a reference to a referenced memory object; and
    marking the referenced memory object as in use.

3. The method according to claim 2, wherein
    the steps of reading the contents of the stack and marking the referenced memory object as in use are performed atomically.

4. The method according to claim 2, further comprising:
    lowering a priority level of the garbage collector when the steps of reading the contents of the stack and marking the referenced memory object as in use are completed.

5. The method according to claim 1, further comprising:
    repeating the steps of marking the second memory object and reclaiming the third memory object; and
    controlling the frequency of repetition of the steps of marking the second memory object and reclaiming the third memory object.

6. A method for memory reclamation, comprising:

marking a first memory object when an attempt to alter a reference to the first object is detected by a software write barrier;

reading the contents of a stack, the stack containing a reference to a referenced memory object;

marking the referenced memory object;

raising a priority level of a garbage collector to a raised level before the steps of reading the contents of a stack and marking the referenced memory object; and maintaining the priority level of the garbage collector at a raised level during the steps of reading the contents of a stack and marking the referenced memory object.

7. The method according to claim 6, further comprising:

reading the contents of a global memory location, the global memory location containing a reference to a referenced memory object; and marking the referenced memory object as in use.

8. A method for memory reclamation, comprising:

marking a first memory object as in use when an attempt to alter a reference to the first memory object is detected by a software write barrier;

reading the contents of a stack, the stack containing a reference to a referenced memory object;

marking the referenced memory object as in use;

interpreting a word contained in the stack as a pointer, the pointer referencing a location in a potentially referenced memory object; and marking the potentially referenced memory object as in use.

9. A method for memory reclamation, comprising:

marking a first memory object as in use when an attempt to alter a reference to the first memory object is detected by a software write barrier;

reading the contents of a register associated with a task;

interpreting the contents of the register as a pointer, the pointer referencing a location in a potentially referenced memory object; and marking the potentially referenced memory object as in use.

10. A method for memory reclamation, comprising:

marking a first memory object when an attempt to alter a reference to the first memory object is detected by a software write barrier;

marking a second memory object when the second memory object is visited by a garbage collector;

reclaiming an unmarked memory object;

repeating the steps of marking the second memory object and reclaiming the unmarked memory object; and controlling the frequency of repetition of the steps of marking the second memory object and reclaiming the unmarked memory object;

wherein the frequency of repetition is controlled by adjusting the priority of a garbage collector.

11. A method for memory reclamation, comprising:

marking a first memory object when an attempt to alter a reference to the first memory object is detected by a software write barrier;

marking a second memory object when the second memory object is visited by a garbage collector;

reading the contents of a global memory location, the global memory location containing a reference to a third referenced memory object;

marking the third referenced memory object;

reading the contents of a stack, the stack containing a reference to a fourth referenced memory object;

marking the fourth referenced memory object;

raising a priority level of a garbage collector to a raised level before the steps of reading the contents of the stack and marking the fourth referenced memory object;

maintaining the priority level of the garbage collector at a raised level during the steps of reading the contents of the stack and marking the fourth referenced memory object;

lowering the priority level of the garbage collector when the steps of reading the contents of the stack and marking the fourth referenced memory object are completed; and reclaiming an unmarked memory object;

lowering the priority level of the garbage collector when the step of reclaiming the unmarked memory object is completed;

wherein the steps of reading the contents of the stack and marking the fourth referenced memory object are performed atomically.

12. A system comprising:

a software write barrier, the software write barrier marking a first memory object when an attempt is made to alter a reference to the first memory object;

a garbage collector, the garbage collector visiting and marking a second memory object, the garbage collector reclaiming a third memory object that has not been marked;

a garbage collector controller, the garbage collector controller controlling the frequency and duration of execution of the garbage collector;

a priority control scheme, the garbage collector controller using the priority control scheme to control the frequency and duration of execution of the garbage collector.

13. The system according to claim 12, further comprising:

a garbage collection data structure, the garbage collection data structure accessible by the garbage collector.

14. The system according to claim 13, wherein the garbage collection data structure includes a variable indicative of whether a memory object has been visited by the garbage collector.

15. The system according to claim 13, wherein the garbage collection data structure includes a variable indicative of whether a memory object is available for reclamation.

16. The system according to claim 13, wherein the garbage collection data structure includes a variable indicative of whether all children of a memory object have been visited by the garbage collector.

17. The system according to claim 12, wherein the garbage collector reads the contents of a global memory location, the global memory location containing a reference to a referenced memory object, the garbage collector marking the referenced memory object as in use.

18. A method, comprising receiving a software module, the software module including at least one instruction that modifies a pointer, the pointer referencing a memory object; and inserting a software write barrier in the at least one instruction that modifies the pointer;

wherein the software write barrier includes computer code that tests a variable indicative of whether one of the memory object has been visited by a garbage collector, and the memory object is available for reclamation.

19. The method according to claim 18, wherein the software write barrier is automatically inserted by a compiler when the software module is compiled.

20. The method according to claim 18, wherein the software write barrier includes computer code that sets a variable to indicate the memory object has been visited by the garbage collector.

21. The method according to claim 18, wherein the software write barrier includes computer code that sets a variable to indicate the memory object is not available for reclamation.

22. The method according to claim 21, wherein the software write barrier is automatically inserted by a compiler when the software module is compiled.

23. A system, comprising:

a compiler, the compiler receiving a software module, the software module including at least one instruction that modifies a pointer, the compiler automatically inserting a software write barrier in the at least one instruction that modifies the pointer.

24. An article of manufacture comprising a computer-readable medium having stored thereon instructions adapted to be executed by a processor, the instructions which, when executed, define a series of steps to be used to control memory reclamation, said steps comprising:

marking a first memory object as in use when the first memory object is visited by a garbage collector;

marking a second memory object as in use when an attempt to alter a reference to the second memory object is detected by a software write barrier;

reclaiming a third memory object; and lowering a priority level of a garbage collector in response to the reclamation of the third memory object.

25. An article of manufacture comprising a computer-readable medium having stored thereon instructions adapted to be executed by a processor, the instructions which, when executed, define a series of steps to be used to control a method, said steps comprising:

receiving a software module, the software module including at least one instruction that modifies a pointer; and automatically inserting a software write barrier in the at least one instruction that modifies the pointer.

* * * * *